(12) United States Patent
Krüger

(10) Patent No.: US 9,942,119 B2
(45) Date of Patent: Apr. 10, 2018

(54) ADAPTIVE JITTER BUFFER

(71) Applicant: BINAURIC SE, Hallbergmoos (DE)

(72) Inventor: Hauke Krüger, Aachen (DE)

(73) Assignee: Binauric SE, Hallbergmoos, DE (US)

( * ) Notice: Subject to any disclaimer, the term of this patent is extended or adjusted under 35 U.S.C. 154(b) by 19 days.

(21) Appl. No.: 15/022,161

(22) PCT Filed: Sep. 19, 2013

(86) PCT No.: PCT/EP2013/069536
§ 371 (c)(1),
(2) Date: Mar. 15, 2016

(87) PCT Pub. No.: WO2015/039691
PCT Pub. Date: Mar. 26, 2015

(65) Prior Publication Data
US 2016/0234088 A1    Aug. 11, 2016

(51) Int. Cl.
*H04L 12/26*    (2006.01)
*H04J 3/06*    (2006.01)
(Continued)

(52) U.S. Cl.
CPC .......... *H04L 43/087* (2013.01); *H04J 3/0632* (2013.01); *H04L 7/0029* (2013.01);
(Continued)

(58) Field of Classification Search
CPC ..... H04L 43/087; H04L 25/05; H04L 7/0029; H04L 2012/5681; H04M 1/2535; H04J 3/0632
See application file for complete search history.

(56) References Cited

U.S. PATENT DOCUMENTS 6,816,492 B1 * 11/2004 Turner ................ H04L 49/1515
                                                                370/394
7,339,503 B1 * 3/2008 Elenes ............... H03H 17/0027
                                                                341/60
(Continued)

FOREIGN PATENT DOCUMENTS

EP        2 355 387 A1    8/2011
WO       2012/167479    12/2012

OTHER PUBLICATIONS

Blauert, J., "Spatial hearing: The Psychophysics of Human Sound Localization," The MIT Press, Cambridge, Massachusetts, 1983, 2 intro pgs., pp. 137-177.

(Continued)

*Primary Examiner* — Thai Nguyen
(74) *Attorney, Agent, or Firm* — Seed IP Law Group LLP

(57) ABSTRACT

The present disclosure relates to an adaptive jitter buffer for buffering audio data received via a network. The adaptive jitter buffer comprises an adaptive audio sample buffer, which comprises an adaptive resampler that receives a number of audio samples of the audio data and that outputs a first number of audio samples, which are resampled from the received number of audio samples according to a resampling factor, an audio sample buffer that buffers audio samples, wherein the outputted first number of audio samples are written to the audio sample buffer during an input access event and a second number of audio samples are read from the audio sample buffer during an output access event, and an audio sample buffer fill quantity controller that controls a fill quantity of the audio sample buffer based on controlling the resampling factor of the adaptive resampler.

17 Claims, 6 Drawing Sheets

(51) Int. Cl.
    *H04L 7/00*     (2006.01)
    *H04L 25/05*    (2006.01)
    *H04M 1/253*    (2006.01)
    *H04L 12/70*    (2013.01)
(52) U.S. Cl.
    CPC .......... *H04L 25/05* (2013.01); *H04M 1/2535* (2013.01); *H04L 2012/5681* (2013.01)

(56) References Cited

U.S. PATENT DOCUMENTS

2005/0088975 A1* 4/2005 Wildfeuer ............ H04J 3/0632 370/235
2005/0157828 A1 7/2005 Midya et al.

OTHER PUBLICATIONS

Dolson, M., "The Phase Vocoder: A Tutorial," Computer Music Journal, vol. 10, No. 4, 1986, pp. 14-27.

Huang, S-F. et al., "A New Optimal Adaptive Voice Smoother Based on Langrangian Multipler Method for VoIP Service," WSEAS Transactions on Communications, WSEAS Press, Athens, GR, vol. 5, No. 5, May 1, 2006, pp. 898-905.

Liang, Y. J. et al., "Adaptive Playout Scheduling Using Time-scale Modification in Packet Voice Communications," 2001 IEEE International Conference on Acoustics, Speech, and Signal Processing, Salt Lake City, UT, May 7-11, 2001, vol. 3, pp. 1445-1448.

Pawig, M. et al., "Adaptive Sampling Rate Correction for Acoustic Echo Control in Voice-Over-IP," IEEE Transactions on Signal Processing, vol. 58, No. 1, Jan. 2010, pp. 189-199.

Verhelst, W. et al., "An Overlap-add Technique Based on Waveform Similarity (WSOLA) for High Quality Time-scale Modification of Speech," Acoustics, Speech, and Signal Processing, 1993, ICASSP-93, 1993 IEEE International Conference, vol. 2, pp. 554-557.

Yahnik, M. et al., "Measurement and Modelling of the Temporal Dependence in Packet Loss," Proceedings of IEEE Joint Conference on the IEEE Computer and Communications Societies, New York, NY, vol. 1, Mar. 1999; pp. 342-352.

* cited by examiner

ADAPTIVE JITTER BUFFER

BACKGROUND

Technical Field

The present invention generally relates to the field of audio data processing. More particularly, the present invention relates to an adaptive jitter buffer for buffering audio data received via a packet-switched network. Furthermore, the present invention relates to a device for receiving audio data, comprising the adaptive jitter buffer.

Description of the Related Art

Introduction

Voice-over-internet-protocol (VOIP) telephony allows flexible realizations of communication applications since the access to the transport medium is no longer restricted by telephone companies: VOIP terminals can be realized as softphones on PCs, laptops, and mobile handheld devices, such as smartphones, as long as an internet access is provided that allows to access the world-wide-web (WWW) as the transport medium to connect people all over the world.

However, in comparison to conventional telephony applications over public-switched-telephone-networks (PSTNs), the flexibility of the transport medium WWW comes at the price of new challenging technical problems, which may be solved by engineers for ensuring a high quality VOIP communication.

In conventional telephony over PSTNs, for many years, a so-called circuit-switched transport medium has established a channel was exclusively reserved for a specific connection between two communicating partners. Data transmitted by one partner reached the other partner via a deterministic connection with well-known temporal delay and negligible data loss rates.

These days, in VOIP, media data—that is, in most cases at least audio data, but often also video data—is transmitted in packets, which contain data for short time periods, via an internet-protocol (IP) link, often denoted as packet-switched networks. No channel is exclusively reserved and no route is known in advance, such that the connection cannot be considered as being deterministic any longer. Even worse: often adjacent packets produced by VOIP terminals follow different routes and in many cases cross different network topologies—denoted as heterogeneous networks. However, various drawbacks can result from the use of non-deterministic transmission links.

In practice, many problems in a VOIP communication application caused by the non-deterministic nature of the transport medium are the so-called network jitter as well as frame losses. The technological functionality that addresses both problems in VOIP terminals is the adaptive jitter buffer described in the following.

BRIEF SUMMARY

Objects and Solutions

Embodiments described herein provide an adaptive jitter buffer for buffering audio data received via a packet-switched network to avoid, or at least reduce, discontinuities in audio playback caused by jitters in the packet-switched network. Embodiments described herein also provide a device for receiving audio data, comprising the adaptive jitter buffer.

In various embodiments, an adaptive jitter buffer for buffering audio data received via a packet-switched network is presented, wherein the adaptive jitter buffer comprises: an adaptive audio sample buffer, wherein the adaptive audio sample buffer comprises:
an adaptive resampler for receiving a number of audio samples of the audio data and for outputting a first number of audio samples, which are resampled from the received number of audio samples according to a resampling factor,
an audio sample buffer for buffering audio samples, wherein the outputted first number of audio samples are written to the audio sample buffer during an input access event and a second number of audio samples are read from the audio sample buffer during an output access event, and
an audio sample buffer fill quantity controller for controlling the fill quantity of the audio sample buffer, wherein the audio sample buffer fill quantity controller is adapted to control the fill quantity of the audio sample buffer based on controlling the resampling factor of the adaptive resampler.

The audio sample buffer fill quantity controller comprises:
an audio sample buffer fill quantity estimator for estimating an average instantaneous fill quantity of the audio sample buffer during an observation event,
a jitter estimator for estimating a jitter,
an audio sample buffer target fill quantity determiner for determining a target fill quantity of the audio sample buffer in dependence of the estimated jitter, and
an adaptive resampler controller for controlling the resampling factor of the adaptive resampler such that the fill quantity of the audio sample buffer approaches the determined target fill quantity of the audio sample buffer.

In at least one embodiment, the audio sample buffer fill quantity estimator is adapted to estimate the average instantaneous fill quantity of the audio sample buffer during the observation event based on calculating a weighted average of the fill quantities of the audio sample buffer between pairs of temporally adjacent access events that occurred between the observation event and a temporally adjacent previous observation event.

In at least one embodiment, the calculation of the weighted average includes weights that depend on the normalized temporal distances between the pairs of temporally adjacent access events.

In at least one embodiment, the number of input access events between the observation event and the temporally adjacent previous observation event is in the range between 2 and 20, between 5 and 15, or between 8 and 12.

In at least one embodiment, the audio sample buffer target fill quantity determiner is adapted to determine the target fill quantity of the audio sample buffer based on determining a fill quantity variance corridor of the audio sample buffer, wherein the target fill quantity of the audio sample buffer is determined to be located within the fill quantity variance corridor of the audio sample buffer.

In at least one embodiment, the audio sample buffer target fill quantity determiner is adapted to determine the fill quantity variance corridor of the audio sample buffer based on determining a first portion of the fill quantity variance corridor of the audio sample buffer independent of a jitter and a second portion of the fill quantity variance corridor of the audio sample buffer in dependence of the estimated jitter.

In at least one embodiment, the audio sample buffer target fill quantity determiner is adapted to determine the target fill quantity of the audio sample buffer based on determining a safety distance between the fill quantity variance corridor of the audio sample buffer and a buffer underrun condition of the audio sample buffer.

In at least one embodiment, the audio sample buffer target fill quantity determiner is adapted to perform a temporal smoothing of the determined target fill quantity of the audio sample buffer.

In at least one embodiment, the adaptive resampler controller is adapted to control the resampling factor of the adaptive resampler based on determining a corridor surrounding the determined target fill quantity of the audio sample buffer, wherein the control is performed differently depending on whether the estimated average instantaneous fill quantity of the audio sample buffer is inside or outside the corridor.

In at least one embodiment, the adaptive resampler controller is adapted to control the resampling factor of the adaptive resampler such that the outputted first number of audio samples is effectively a fractional number.

In at least one embodiment, the adaptive jitter buffer further comprises:
a packet buffer for reordering packets, which comprise an encoded version of the audio data, in case the packets are received in an incorrect temporal order via the packet-switched network.

In at least one embodiment, the adaptive jitter buffer further comprises:
an audio data decoder for decoding the encoded version of the audio data, wherein the audio data decoder comprises a first audio data loss concealer for artificially generating audio data in case a packet was lost or could not be reordered.

In at least one other embodiment, the adaptive jitter buffer comprises:
a second audio data loss concealer for artificially generating audio data samples in case of a buffer underrun condition of the audio sample buffer.

In at least one embodiment, the audio data comprises a first audio channel and a second audio channel, wherein the adaptive resampler is adapted to resample audio samples from the first audio channel and audio samples from the second audio channel, and wherein the adaptive resampler controller is adapted to control the resampling factor of the adaptive resampler to be the same for the audio samples from the first audio channel and the audio samples from the second audio channel.

In other embodiments, a device for receiving audio data is presented, wherein the device comprises the adaptive jitter buffer as described herein.

It shall be understood that the adaptive jitter buffer for buffering audio data received via a packet-switched network and the device for receiving audio data have similar and/or identical embodiments.

It shall be understood that an embodiment of the present invention can also be any combination of the various embodiments described herein.

BRIEF DESCRIPTION OF THE SEVERAL VIEWS OF THE DRAWINGS

These and other aspects of the disclosure will be apparent from and elucidated with reference to the embodiments described hereinafter. In the following drawings.

DETAILED DESCRIPTION

Embodiments described herein are for an adaptive jitter. It is noted that the focus of this description will be primarily on audio aspects, because humans are more sensitive against temporal delays and signal interrupts in audio signals than in video signals.

The proposed adaptive jitter buffer is suitable for different kinds of VOIP softphones and terminal devices. However, in some embodiments, the selection of the adaptive resampler may be designed to focus on the preservation of binaural cues in the context of binaural telephony.

Connected Terminal Devices and End-to-End Delay in VOIP Communication

Figure 1:
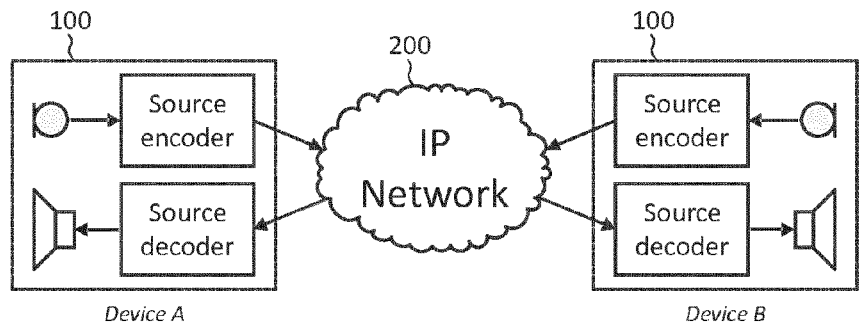
FIG. 1 shows a peer-to-peer VOIP communication.

In VOIP based communication, two audio devices (devices A and B in FIG. 1) play back and record audio data independently. Recorded audio samples are stored in buffers which are fed into a source coding scheme to reduce the required transmission data rate. After being transferred from the one side to the other, the arriving packets are decoded and afterwards transformed into a continuous stream of audio samples, which are played back by a loudspeaker.

Naturally, instead of a simple peer-to-peer communication, more than two devices may be involved. For the sake of simplicity, however, the focus will be on a peer-to-peer audio communication link within this specification.

Sometimes there is a temporal delay between the moment when the one communication partner emits an audio signal and the moment when the other partner listens to the emitted signal. This delay is caused by numerous technical procedures such as, e.g., buffering of audio samples, transmission delays, and audio signal processing.

Typically, a VOIP communication is fully duplex, that is, the communication partners on both sides can interactively interrupt—whether this happens by intention or not—the connected partner by talking while the other partner talks. In this context, a communication session can be degraded in terms of communication quality if the end-to-end-delay of the VOIP communication session is too high. If that is the case, the number of verbal interruptions increases and the communication partners tend to perceive the communication as annoying and may even end the communication. As a result the design of a VOIP terminal application to achieve a low end-to-end delay is desirable.

The Nature and the Impact of Network Jitter

VoIP transmission schemes, in most cases, rely on the so-called User Datagram Protocol (UDP). However, due to wide-spread use of firewalls and routers in local private home networks, applications may also employ the Transmission Control Protocol (TCP). Developers of a VOIP application often design the underlying protocol to be hidden from the users and negotiated by the VOIP application without the need for any user interaction.

In both cases, UDP and TCP, due to the non-deterministic nature of the transport medium world-wide-web (WWW), packets emitted by one side of the communication arrive in time very often, but also may arrive with a significant delay (denoted as the network jitter). In the case of UDP, packets may also get lost during the transmission (denoted as a frame loss). If a packet does not arrive in time, audible artifacts may occur due to gaps in the audio signal caused by the loss of audio samples comprised by the lost packet.

The impact of network jitter is demonstrated in the following by comparing FIGS. 2 and 3.

Figure 2:
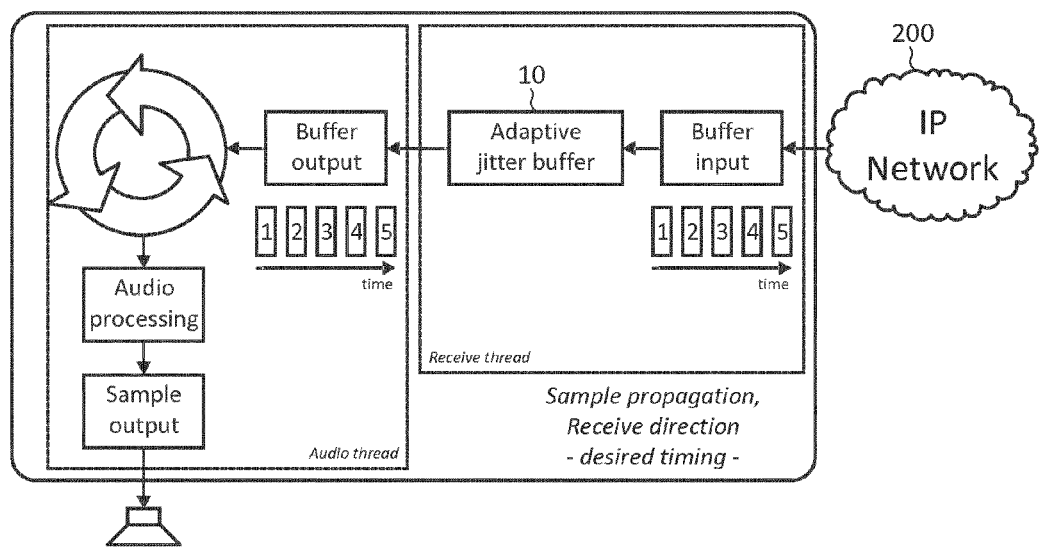
FIG. 2 shows an example of receiving packets from a VOIP network without network jitter.

In FIG. 2, a typical communication link between a sender and a receiver is shown under the assumption that there is no network jitter. It is noted that for the sake of simplicity, only the receiver side and hence the playback part of the communication link is shown.

As shown in the figure, audio playback and the arrival of packets may be realized in independent threads, denoted here as audio thread and receive thread.

The packets arrive from the network in the context of the receive thread periodically. The incoming packets are denoted as packets 1, 2, 3, 4 and 5 in the example shown in FIG. 2.

After arrival, the packets are transferred to the audio thread, in which the audio samples, which were recorded on the side of the connected partner, are reconstructed to provide a continuous stream of audio data that is played back by a loudspeaker. In most applications, the audio thread may also work based on packets of audio samples, because the VOIP terminal is operated in a non-real-time-system such as a PC, laptop, or mobile handheld device. It is noted that the sizes of the packets arriving via the network and of the packets that are used to feed data to the loudspeaker are in general not equal, which, however, is neglected for the sake of simplicity here.

No problem arises in the example shown in FIG. 2, because the packets arrive periodically such that the continuous stream of audio samples for playback does not interrupt.

Figure 3:
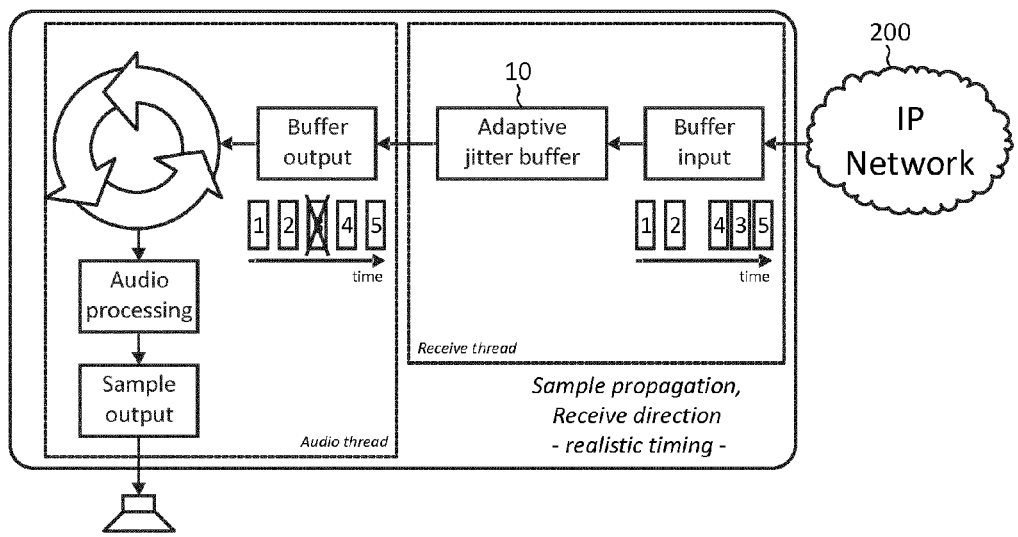
FIG. 3 shows an example of receiving packets from a VOIP network with network jitter.

In FIG. 3, basically the same situation is shown in the presence of a network jitter.

In this case, packet 3 has been transmitted via a different route over the transport medium WWW compared to packets 2 and 4. As a consequence, packet 3 arrives after packet 4. Without use of any jitter buffer, the playback can proceed until the stream of samples can no longer be continued at the moment at which packet 3 should be played back. The consequence is that an acoustic artifact (dropout) may be audible.

In order to compensate for the shown packet delays, a certain budget of audio samples can be stored at the receiver side, which is realized in the jitter buffer. The larger this storage of audio samples is, the higher can be the delay which can be compensated without the occurrence of any audible acoustic artifacts. However, if the storage is too large, the end-to-end delay of the communication becomes too high, diminishing the overall communication quality.

The network jitter characteristics observed in real applications are in general strongly time-varying. An example with strongly variable network jitter is a typical WIFI router used in many households nowadays. Often, packets are not transmitted via the WIFI transmission link for a couple of hundred milliseconds if a microwave oven is used producing disturbances in the same frequency band used by WIFI or if a Bluetooth link is used in parallel. Therefore, a suitable jitter buffer should be managed and should adapt to the instantaneous network quality observed by the VOIP communication application. Such a jitter buffer is denoted as an adaptive jitter buffer in this specification.

Other Causes for Jitter

Targeting the development of a VOIP softphone, most people mention the described network jitters as the main sources for packet delays. However, other sources of jitters can be observed in practice:

Soundcard jitter: Most of today's VOIP terminal applications are realized on PCs, laptops, or mobile handheld devices, such as smartphones, which have in common that the operating system is not suited for applications with hard real-time constraints, because response times cannot be guaranteed. In order to overcome this problem for audio processing (which relies on response times to avoid audio dropouts), audio samples are grouped to form buffers used for audio playback and recording, which should be large enough to avoid audio dropouts. The operating system typically requests these buffers to be filled or emptied by the application on a regular time basis.

However, requests for new buffers for playback and recording may not occur on a regular time basis. This behavior is denoted as the soundcard jitter in this specification.

Sample rate drifts: Given two independent clock rates on the two sides involved in a VOIP communication, there is always a slight drift in sample rates. This drift is generally due to slight deviations of the oscillator frequency in the employed hardware components. On PCs, laptops, and smartphones, however, in some cases, the range of combinations of sample rates and processing buffer sizes is limited. Since the number of audio samples in buffers is assumed to be constant and of integer value, there might be cases, in which the effective sample rate, which is determined by the relations of input and output buffer sizes of the involved fixed resamplers, may be slightly different from the intended sample rate.

The isolated measurement of network and soundcard jitters as well as sample rate drifts is hard to achieve since the symptoms for these characteristics are identical.

Definition of Terms

Figure 4:
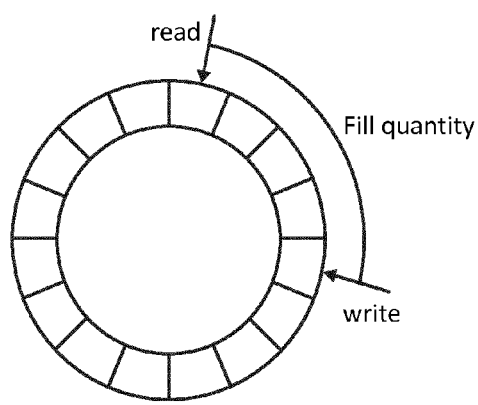
FIG. 4 shows schematically and exemplarily a circular buffer that can be used as an audio sample buffer.

At first, some terms shall be defined:

Circular buffer: Normally, a buffer that is used in audio applications contains some kind of data memory that is accessed in a FIFO manner. In the adaptive jitter buffer, this memory may be realized as a circular buffer for storing audio samples (see FIG. 4), which can be implemented based on a linear array of memory locations and an addressing logic that performs a wrap-around at the end of the linear memory space. The data memory may be accessed to write data thereto and to read data therefrom in two independent threads. Read and write processes should be secured in terms of access to the buffer administrative control by mutexes ("mutual exclusions").

The audio sample buffer may have a specific constant maximum length. The fill quantity of the audio sample buffer is an instantaneous value and describes the number of audio samples stored in the buffer.

Buffer delay: The number of audio samples in the buffer, the buffer fill quantity, determines the input-output delay. Given that an audio sample is written to the buffer, the number of audio samples to be read from the buffer until that written sample is output is identical to the instantaneous fill quantity due to the FIFO principle. In audio applications, signals are written to and read from the jitter buffer based on buffers, and the temporal relations of read and write accesses is strongly time-varying. Therefore, the instantaneous fill quantity is an indicator of the order of the current delay, but it does not provide exact delay values.

Buffer underrun: If the audio application requests a specific number of audio samples from the jitter buffer, but the fill quantity does not allow to provide this number of samples, a buffer underrun occurs. In that situation, the continuous stream of audio samples in audio playback is not possible unless an efficient algorithm provides replacement audio samples in order to overcome this situation without any (or with only neglectable) artifacts (frame loss concealment or audio data loss concealment).

Buffer overrun: If new audio samples arrive, but the jitter buffer does not have enough space available to store all arriving samples, a buffer overrun occurs. The samples that were intended to be passed to the jitter buffer are lost and can lead to a non-continues signal evolution which is audible as an audio artifact. Buffer overruns are not a common problem in VOIP terminals, because the (circular) buffer may be chosen as large as desired on most platforms nowadays.

Temporal Events

The adaptive jitter buffer proposed in this specification makes use of an audio sample buffer that is influenced from within three independent threads. Any action to make use of the audio sample buffer from within each thread is a temporal event, during which the audio sample buffer is accessed or specific states of the audio sample buffer are observed and estimated. The following temporal events are considered:

Input access event $K_{in}$: During an input access event, audio samples are written to the audio sample buffer. This event is caused by the arrival of a packet from the IP network. The mathematical notation for the time shall in the following be given as $t_{in}(K_{in})$. Here, it is assumed that during each input event, a specific number of $N_{in}$ samples is transferred to the audio sample buffer, which depends on the frame size related to the packet that arrives from the network. Sequences of input events are denoted as $K_{in,i}$ with i=0, 1, 2, . . . .

Output access event $K_{out}$: An output access event occurs if the audio playback functionality requests audio samples from the audio sample buffer for audio playback. The mathematical term for the time of a specific output access event shall be $t_{out}(K_{out})$. It is assumed that a specific number of $N_{out}$ samples is transferred from the audio sample buffer to the operating system for playback during each output access event. Sequences of output access events are denoted as $K_{out,i}$ with i=0, 1, 2, . . . .

Observation event $K_{obs}$: An observation event is a reoccurring, e.g., periodic, event, during which temporal changes of the audio sample buffer fill quantity and the network status are analyzed. The mathematical term for the time at which an observation event occurs shall be $t_{obs}(K_{obs})$. Sequences of observation events are denoted as $K_{obs,i}$ with i=0, 1, 2, . . . .

Note that since the described access events can occur periodically, the basis for the analysis of temporal aspects in the control and analysis of the audio sample buffer are sequences of timestamps $t_{in}(K_{in})$, $t_{out}(K_{out})$, and $t_{obs}(K_{obs})$.

Special Considerations for Binaural Telephony (HD-Audio-3D)

HD-Audio-3D—also denoted as binaural telephony—is expected by many to be the next emerging technology in communication. The benefit of HD-Audio-3D in comparison to conventional HD-Voice communication lies in the use of a binaural instead of a monaural audio signal: Audio contents are captured and played by binaural terminals involving at least two microphones and two speakers, yielding an exact acoustical reproduction of what the remote communication partner really hears. Binaural telephony is "listening to the audio ambience with the ears of the remote speaker". The pure content of the recorded speech is extended by the capturing of the acoustical ambience. In contrast to the transmission of stereo contents, which allow a left-right location of sound sources, the virtual representation of room acoustics in binaural signals is based on differences in the time of arrival of the signals reaching the left and the right ear as well as attenuation- and filtering effects caused by the human head, the body and the ears, allowing the location of sources also in vertical direction.

In order to allow a realistic reproduction of the acoustic ambience, which is the goal in binaural telephony, all signal processing components involved in the transmission of the audio content from the recording to the playback side should preserve the binaural cues inherent to the audio signal recorded with a sophisticated binaural recording device. In this context, the binaural cues are defined as the characteristics of the relations between the two channels of the binaural signal, which are commonly mainly expressed as the Interaural Time Differences (ITD) and the Interaural Level Differences (ILD) (see J. Blauert. Spatial hearing: The psychophysics of human sound localization. The MIT press, Cambridge, Mass., 1983).

The ITD cues influence the perception of the spatial location of acoustic events at low frequencies due to the time differences between the arrival of an acoustic wavefront at the left and the right human ear. Often, these cues are also denoted as phase differences between the two channels of the binaural signal. The human perception is rather sensitive to these cues, and already a very light shift of a fraction of a millisecond between the left and the right signal has a significant impact on the perceived location of an acoustic event. This is rather intuitive, because with the known speed of sound of approximately c=340 m/s, a wavefront typically propagates from one ear to the other in approximately 0.7 milliseconds (distance approximately 25 cm).

In contrast to this, the ILD binaural cues have a strong impact on the human perception at high frequencies. The ILD cues are due to the shadowing and attenuation effects caused by the human head given signals arriving from a specific direction: The level tends to be higher at that side of the head which points into the direction of the origin of the acoustic event.

Design Goals for Adaptive Jitter Buffers

Design goals for the adaptive jitter buffer exemplarily described in the following are:

Avoid underrun conditions to avoid audio artifacts.

Avoid overrun conditions to avoid audio artifacts.

Avoid high average buffer fill quantity to achieve operation with a minimum end-to-end delay.

Do not lose any parts of the audio signal. It is better to increase the delay for a short moment than to loose important parts of a conversation.

If a buffer fill quantity adaptation is used, this should not be audible.

Binaural cues should be preserved (if the application is to be suitable for HD-Audio-3D).

In summary, the adaptive jitter buffer should be controlled such as to avoid losses of audio samples given the minimum necessary fill quantity (and therefore delay) in all conditions.

Involved Jitter Model

In some embodiments, a model of the jitter—e.g., the network jitter—may be realized using a variety of different methods, e.g., M. Yajnik et al., Measurement and modelling of the temporal dependence in packet loss, in proceedings of IEEE Joint Conference on the IEEE Computer and Communications Societies, New York, N.Y., USA, vol. 1, pages 342 to 352, March 1999.

In may not be possible to exactly describe the circumstances often found in practice by means of a mathematical model, because the actual behavior may depend on the realizations of functionality in routers, operating systems, drivers, PCs, etc.

Nevertheless, both good situations, in which almost no jitter can be observed, as well as bad situations, in which a big portion of the packets are being lost, may be observed. Certainly, a more accurate classification would be useful to operate most effectively in all situations.

Here, only a simple model is assumed: If packet losses start to occur, it is likely that this state does not change immediately. As a conclusion, given that a buffer underrun has occurred, it is likely that at least additional underruns may be seen, which should be prevented or reduced. And if after a phase with many losses, a phase of a good state is observed for a specific time, it is assumed to be likely that the network will remain in a good state with low network jitters and few losses for a longer time.

Top-Down Functionality Description

The proposed adaptive jitter buffer shall be described in the following according to a top-down procedure. The setup and the involved adaptive jitter buffer were already shown in FIG. 3.

Figure 5:
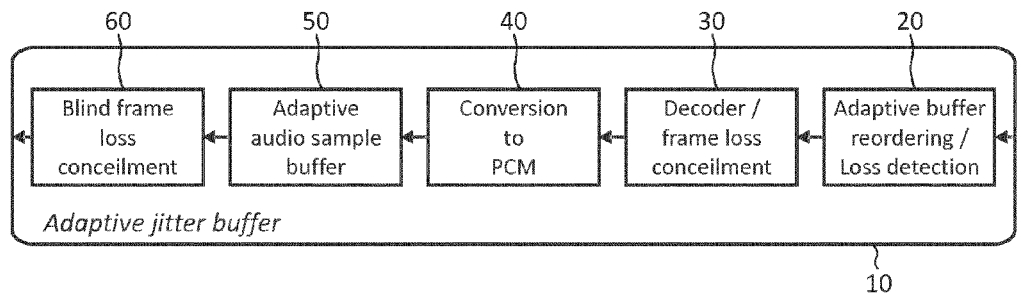
FIG. 5 shows schematically and exemplarily the main components of an embodiment of an adaptive jitter buffer.

In FIG. 5, the functional blocks involved in the adaptive jitter buffer 10 are shown more in detail.

Two main components are shown in the figure: an adaptive packet buffer 20 (denoted as "adaptive buffer reordering/loss detection" block in the figure) and an adaptive audio sample buffer 50. The adaptive buffer reordering/loss detection block 20 is used in cases where the communication terminal is operated such that audio data may arrive in wrong order. On the one hand, it should buffer incoming packets to compensate for the case where packets are arriving in wrong order. On the other hand, it should not buffer too long in order to reduce the end-to-end delay and it should detect if packets arrive outside the temporal horizon in which a reordering is possible. As a result, the adaptive buffer reordering/loss detection block 20 may be utilized if the VOIP communication involves the UDP transport protocol. In TCP, packages may arrive late but are generally never lost.

Packets which have arrived are fed into the audio data decoder 30 (denoted as "decoder/frame loss concealment" block in the figure) to be transformed into a sequence of samples ("conversion to PCM" block 40 in the figure). From here, the samples are transferred to the adaptive audio sample buffer 50. In case that a packet is lost or arrives outside the temporal horizon in which a buffer reordering would be possible, instead of decoding a frame in the decoder/frame loss concealment block 30, the decoder is requested to perform a frame loss concealment (or audio data loss concealment), in which it generates replacement audio data. Even in this case, the output from the decoder/frame loss concealment block 30 is fed into the adaptive audio sample buffer block (via the "conversion to PCM" block 40).

If a new frame of audio samples is requested by the audio thread, samples are taken from the adaptive audio sample buffer 50. In case of a buffer underrun, the adaptive audio sample buffer 50 cannot provide the requested audio samples. In this case, the "blind frame loss concealment" block 60 (also denoted as "second audio data loss concealer" in this specification) at the output side of the adaptive audio sample buffer 50 acts to produce audio samples to conceal the underrun.

It is important to distinguish between the decoder based frame loss concealment in the decoder/frame loss concealment block 30 and the blind frame loss concealment in the blind frame loss concealment block 60 at the output side of the adaptive audio sample buffer 50. In general, a decoder can do very efficient frame loss concealment since internal states of the decoder engine are available which can support in the creation of a signal to mimic the signal within the lost frame to hide interruptions of the signal. In contrast to this, the blind frame loss concealment block 60 performs frame loss concealment with no additional information about the signal to be produced to "create something from nothing", therefore denoted as "blind".

The decoder/frame loss concealment block 30 acts whenever it is obvious that a frame will not arrive in time. It is limited to the length of the sequence that would have been produced by the frame if it would have arrived. In contrast to this, the blind frame loss concealment in the blind frame loss concealment block 60 acts if there is a buffer underrun in the adaptive audio sample buffer 50.

A configuration of the contribution of delay to the adaptive buffer reordering/loss detection block 20 and the adaptive audio sample buffer 50 depends on the application and the network constraints and should be realized such that it adapts to the measured network jitter and condition of the transfer medium.

The actual realization of the decoder and the frame loss concealment to be executed within the decoder/frame loss concealment block 30 should be according to the type of application to be realized. The adaptive jitter buffer 10 may be efficient if it has full control of the adaptive audio sample buffer 50 and the decoder/frame loss concealment block 30, because this allows decoding packets and performing the frame loss concealment whenever best to avoid buffer underruns and to achieve a minimum end-to-end delay.

Figure 6:
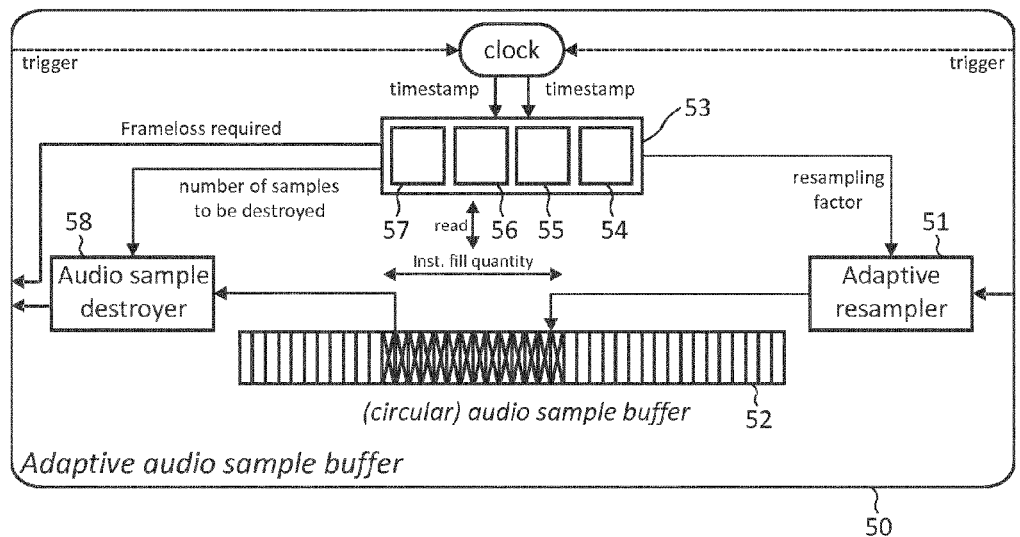
FIG. 6 shows schematically and exemplarily the main components of an adaptive audio sample buffer that can be used in the embodiment of an adaptive jitter buffer shown in FIG. 5.

The functional blocks of the adaptive audio sample buffer 50 are shown in FIG. 6.

On the right side of the figure, audio samples arrive in the context of the input event at the adaptive audio sample buffer 50 from the decoder/frame loss concealment block 30 to be fed into an audio sample buffer 52, which is realized, in this example, as a circular buffer. On the entrance, an adaptive resampler 51 is operated to employ a waveform modification in order to influence the fill quantity of the audio sample buffer 52. The adaptive resampler 51 is controlled by specifying a resampling factor $\kappa_{rs}$, which describes the relation between the number of audio samples received by the adaptive resampler 51 and the number of audio samples output by the adaptive resampler 51. If the fill quantity of the audio sample buffer 52 shall be reduced, the number of received audio samples is greater than the number of output audio samples, whereas it is the inverse relation if the fill quantity of the audio sample buffer 52 is to be increased.

On the left side, audio samples are taken from the audio sample buffer 52 to be passed to the audio playback routines in the context of an output access event. In some embodiments, a number of samples to be destroyed may be specified, which are then removed from the audio sample buffer 52 in order reduce its fill quantity quickly.

In this example, both input as well as output access events occur in independent threads asynchronously. In addition, an average instantaneous fill quantity of the audio sample buffer 52 is determined by observing the instantaneous fill quantity thereof on a regular basis in the context of an observation event.

In order to measure the temporal evolution of the fill quantity of the audio sample buffer 52, every single input, output and observation event is assigned to a specific timestamp.

Given that a buffer underrun has occurred, an indicator is fed into the blind frame loss concealment block 50 to artificially produce and output audio samples to prevent that audio artifacts are audible.

Another element of the adaptive audio sample buffer 50 in FIG. 6 is the audio sample buffer fill quantity controller 53.

In this example, the audio sample buffer fill quantity controller 53 performs the following tasks:

Estimate an average instantaneous fill quantity of the audio sample buffer 52, using an audio sample buffer fill quantity estimator 54.

Estimate a jitter, using a jitter estimator 55.

Determine a target fill quantity of the audio sample buffer 52 in dependence of the estimated jitter, using an audio sample buffer target fill quantity determiner 56.

Provide updates of the resampling factor $\kappa_{rs}$, and, in some embodiments, of the number of samples to be destroyed, using an adaptive resampler controller 57.

These tasks and respective blocks as well as the adaptive resampler 51 will be in detail described in the following.
Realization of the Average Instantaneous Fill Quantity Estimation To measure an average instantaneous fill quantity of the audio sample buffer 52 may be a complex task, because—from a signal processing point of view—the measured values of a fill quantity during the input and output access events can be interpreted as severely disturbed signals, i.e., audio samples are written to and taken from the audio sample buffer 52 as frames of samples at specific moments in time and not continuously over time.

Figure 7:
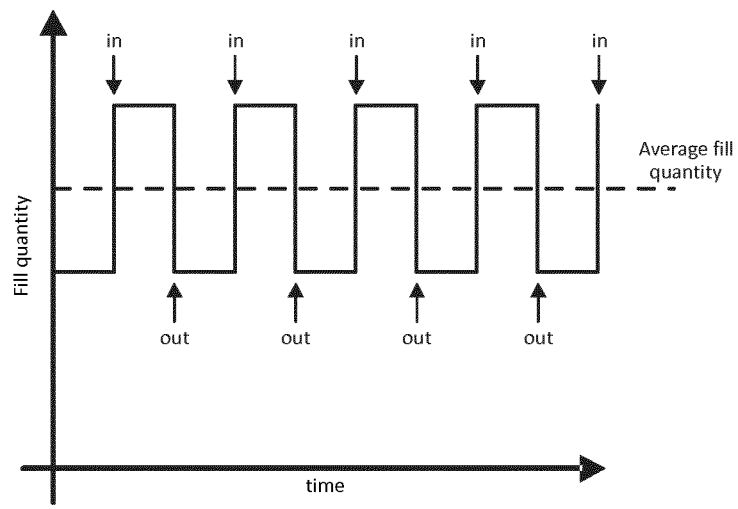
FIG. 7 shows an example illustrating the temporal evolution of the fill height of an audio sample buffer without network jitter.
Figure 8:
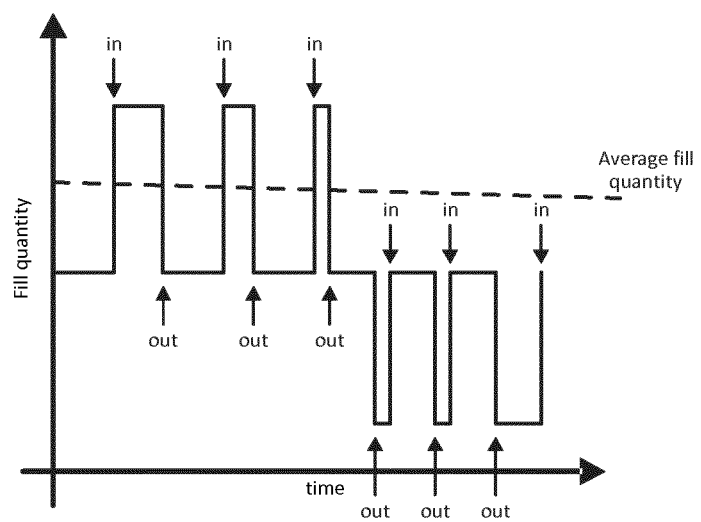
FIG. 8 shows an example illustrating the temporal evolution of the fill height of an audio sample buffer in case of a slight sample rate drift.
Figure 9:
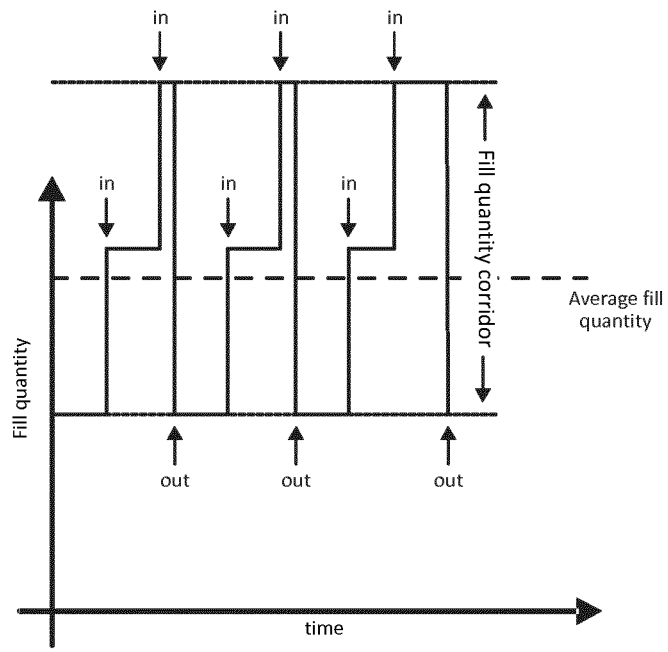
FIG. 9 shows an example illustrating the temporal evolution of the fill height of an audio sample buffer in case of different input and output buffer sizes.

In order to explain this in more detail, plots are given in FIGS. 7, 8, and 9.

The plot shown in FIG. 7 can be considered as a "simple case". Input and output access events occur synchronously, and the number of samples written to the audio sample buffer 52 is identical to the number read from the audio sample buffer 52 at every input and output event, respectively. The "perfect" average instantaneous fill quantity is the stippled line in the middle. The input and output access events can be interpreted as severe disturbances since the fill quantity of the audio sample buffer 52 is massively modified due to the arrival of buffers of audio samples.

A more complex and realistic example is given in FIG. 8, where a slight sample rate drift is present.

In this example, the average instantaneous fill quantity of the audio sample buffer 52 slowly decreases resulting in buffer underrun conditions after a while. Recall that a buffer underrun condition occurs if there are not enough audio samples in the audio sample buffer 52 to fill a complete output buffer given that an output access event occurs.

In FIG. 9, the frame size during each input access event differs from the frame size during each output access event. As a conclusion, input access events occur with a rate twice the rate of the output access events.

In all examples, the curve of the possible fill quantities of the audio sample buffer 52 is located in a corridor, which is shown in FIG. 9. This corridor is denoted as the "fill quantity variance corridor" and is shown here without any additional explanation. However, it is utilized in the following sections describing the determination of the target fill quantity of the audio sample buffer 52.

In this example, in order to determine the average instantaneous fill quantity of the audio sample buffer 52, during every input and output access event, the time period for which the fill quantity of the audio sample buffer 52 has remained in the specific state before this access event is stored in a circular buffer. This circular buffer (not shown in FIG. 6) may be denoted as a "fill quantity short-term memory".

Given a specific event $K_{ev}$ with $K_{ev}$ representing either an input or output access event, $K_{ev}=K_{in}$ or $K_{ev}=K_{out}$, the instantaneous fill quantity of the audio sample buffer 52 present when starting the access event (prior to any output or input access operation) is $\mathcal{F}(K_{ev})$.

The time period for which the fill quantity of the audio sample buffer 52 was constant is then derived from the most recent timestamp among all access events $K_{past}$ that occurred in the past—either in the context of an input or output access event. In this example, it is computed as:

$$\Delta_t(K_{ev}) = t_{ev}(K_{ev}) - \max(t_{past}(K_{past})).$$

The term $K_{past}$, in this context, represents all access events $K_{in,i}$ and $K_{out,i}$ that occurred before the current access event $K_{ev}$. An efficient realization of this operation can be achieved by simply storing the timestamp of each input and output access event to be propagated from access event to access event.

Between different observation events, all pairs of fill quantities $\mathcal{F}(K_{ev})$ and time periods $\Delta_t(K_{ev})$ are stored in the fill quantity short-term memory.

Once an observation event occurs, all pairs of entries in the fill quantity short-term memory are taken into account to derive the average instantaneous fill quantity of the audio sample buffer 52 as $$\hat{\mathcal{F}}(K_{obs}) = \frac{\sum_i \mathcal{F}(K_{ev,i}) \cdot \Delta_t(K_{ev,i})}{\sum_i \Delta_t(K_{ev,i})}$$

with $K_{ev,i}$ representing the pairs $<\mathcal{F}(K_{ev,i}), \Delta_t(K_{ev,i})>$ of fill quantities and time periods stored in the fill quantity short-term memory for all access events since the last observation event.

In some embodiments, the event rates for observation events as well as for input and output access events should be chosen such that multiple input and output access events occur within the time period between temporally adjacent observation events. However, care should be taken to reduce or prohibit significant delays being introduced in the evaluation of the instantaneous fill quantity of the audio sample buffer 52 in order to avoid an instable controller behavior in the adaptive resampler controller 57.

Realization of the Jitter Estimation

An estimation of the jitter shall be described next. It involves different jitter classifications. In particular, it distinguishes between a long-term jitter $\mathcal{L}_{long}$, a considerable jitter $\mathcal{L}_{cons}$, and an instantaneous jitter $\mathcal{L}$. Jitters are estimated in the unit seconds in the following.

The overall jitter of the system typically comprises network jitter and soundcard jitter. Sample rate drifts are not detected as jitters but may be compensated by the adaptive resampler controller 57 implicitly. The estimate of the instantaneous jitter $\mathcal{L}$ is derived from the timestamps given for the input or output access events. Between temporally adjacent input and output access events, the time period that has passed is measured as:

$$\Delta_t(K_{in,i}) = t_{in}(K_{in,i}) - t_{in}(K_{in,i-1})$$

for each input access event and $$\Delta_t(K_{out,i}) = t_{out}(K_{out,i}) - t_{out}(K_{out,i-1})$$

for each output access event.

This "per-frame" time period is transformed into a jitter estimate by subtracting the expected temporal delay between adjacent access events. This expected delay is computed based on the buffer size $N_{out}$ for output access events and $N_{in}$ for input access events as well as the sample rate $f_S$. (It is noted that it is assumed that the input and output sample rate of the jitter buffer are identical. If another sample rate conversion is utilized here, it may be handled outside the audio sample buffer 52):

$$\mathcal{L}_{in} = \max\left(\Delta_t(K_{in}) - \frac{N_{in}}{f_s}, 0\right)$$

for input access events and $$\mathcal{L}_{out} = \max\left(\Delta_t(K_{out}) - \frac{N_{out}}{f_s}, 0\right)$$

for output access events.

The "overall" instantaneous jitter $\mathcal{L}$ is then computed as the sum of jitters from both the input access events and the output access events as $$\mathcal{L} = \mathcal{L}_{in} + \mathcal{L}_{out}.$$

In that term, the output jitter is due to the soundcard jitter of the local audio device whereas the input jitter covers the network jitter and the soundcard jitter introduced by the audio device on the side of the connected communication partner.

Given an instantaneous jitter for a specific access event, the long term jitter can be updated as $$\mathcal{L}_{long} = \max(\mathcal{L}_{long}, \mathcal{L}).$$

In parallel to this, each instantaneous jitter value $\mathcal{L}$ is fed into a long term jitter analyzer. This long term analyzer collects instantaneous jitter values $\mathcal{L}$ for long time periods such as, e.g., 5 seconds. After this time period has expired, the maximum value which occurred during this long term time frame is then used to replace the current value of the long term jitter $\mathcal{L}_{long}$ as $$\mathcal{L}_{long} = \mathcal{L}_{cons}.$$

As a consequence, on the one hand, the estimated long-term jitter $\mathcal{L}_{long}$ may quickly follow larger values in case a new maximum instantaneous jitter $\mathcal{L}$ was observed. On the other hand, the application may wait for a long time period (e.g., 5 seconds) during which the maximum jitter values are observed and—if suitable—reduce the maximum jitter values accordingly.

Derivation of the Target Fill Quantity of the Audio Sample Buffer 52

For the derivation of the target fill quantity of the audio sample buffer 52, at first, a fill quantity variance corridor $\Delta_{\mathcal{F}}$ is defined, in which the curve of the fill quantities of the audio sample buffer 52 is expected to be located in the future given the currently measured long-term jitter $\mathcal{L}_{long}$ and the system setup. For this purpose, reference is made to FIG. 9, in which an exemplary fill quantity variance corridor is shown.

In this example, the fill quantity variance corridor $\Delta_{\mathcal{F}}$ is composed of two parts following $$\Delta_{\mathcal{F}} = \Delta_{\mathcal{F}_{jitter}} + \Delta_{\mathcal{F}_{no\ jitter}}$$

with $$\Delta_{\mathcal{F}_{no\ jitter}} \approx \left\lceil \frac{\max(N_{in}, N_{out})}{\min(N_{in}, N_{out})} \right\rceil \cdot \min(N_{in}, N_{out})$$

as the fill quantity variance corridor of the audio sample buffer 52 given for the special case that there is absolutely no jitter (example shown in FIG. 7). The variance corridor size can be derived from the frame size $N_{in}$—hence the number of samples periodically fed into the audio sample buffer 52 in case of an input access event—and the frame size $N_{out}$—hence the number of samples to be taken from the audio sample buffer 52 in case of an output access event.

The other part in the equation to compute the overall fill quantity variance corridor $\Delta_{\mathcal{F}}$ is $\Delta_{\mathcal{F}_{jitter}}$. It depends on the previously measured long term jitter $\mathcal{L}_{long}$. It is composed of a maximum increase of the fill quantity of the audio sample buffer 52, which depends on the buffer size $N_{in}$ in case of an input access event and the maximum decrease of the fill quantity of the audio sample buffer 52, which depends on the buffer size $N_{out}$ in case of an output access event, which may occur during the time of the maximum jitter $\mathcal{L}_{long}$, $$\Delta_{\mathcal{F}_{jitter}} \approx \left\lceil \frac{\mathcal{L}_{long} \cdot f_s}{N_{out}} \right\rceil \cdot N_{out} \cdot \frac{\gamma_{out}}{2} + \left\lceil \frac{\mathcal{L}_{long} \cdot f_s}{N_{in}} \right\rceil \cdot N_{in} \cdot \frac{\gamma_{in}}{2}.$$

In this context, $\gamma_{in}$ and $\gamma_{out}$ are constants which help to tune the setting for this configuration to take into account sample rate drifts and similar effects in practice with, e.g., $$\gamma_{in}=\gamma_{out}=1.5.$$

In the next step, a safety distance $\Delta_{\mathcal{F}\text{safety}}$ is specified to define a distance between the computed fill quantity variance corridor $\Delta_\mathcal{F}$ of the audio sample buffer 52 and the buffer underrun condition (if the fill quantity is equal to zero, a buffer underrun occurs). Typically, this safety distance $\Delta_{\mathcal{F}\text{safety}}$ can be specified directly and is subject to tuning procedures, the current configuration, and expected network conditions.

Figure 10:
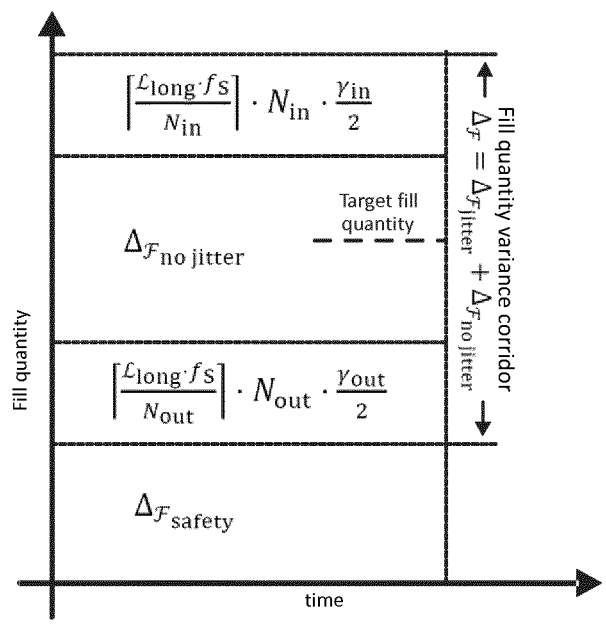
FIG. 10 shows schematically and exemplarily a fill quantity variance corridor and a safety distance used in determining a target fill quantity of an audio sample buffer.

The described fill quantity variance corridor $\Delta_\mathcal{F}$ and its subcomponents as well as the safety distance are shown in a plot similar to those from FIGS. 6 to 9 in FIG. 10.

The target fill quantity is finally given as $$\mathcal{F}_{target}(K_{obs,i}) = \Delta_{\mathcal{F}_{safety}} + \frac{\Delta_{\mathcal{F}_{jitter}}(K_{obs,i}) + \Delta_{\mathcal{F}_{no\,jitter}}(K_{obs,i})}{2}$$

and is shown as the stippled line in the example in FIG. 10.

Considering the temporal evolution of the target fill quantity, the given equations yield a new target fill quantity for each observation event, therefore the target fill quantity should be written as a function of the event as $\mathcal{F}_{target}(K_{obs})$.

From one observation event to the other, however, the target fill quantity may not be not allowed to take arbitrary values. Instead, a temporal smoothing may be employed to compute the effective target fill quantity $\tilde{\mathcal{F}}_{target}(K_{obs})$ from $\mathcal{F}_{target}(K_{obs})$ as follows:

Given that the new target fill quantity $\mathcal{F}_{target}(K_{obs})$ has a lower value than the effective target fill quantity from the previous observation event, the effective target fill quantity is given as $$\tilde{\mathcal{F}}_{target}(K_{obs,i}) = \alpha \cdot \tilde{\mathcal{F}}_{target}(K_{obs,i-1}) + (1-\alpha) \cdot \mathcal{F}_{target}(K_{obs,i})$$

with $\alpha=0.9$ and the index i indicates the temporal dependence.

The target fill quantity may be limited to not exceed half of the overall length of the audio sample buffer 52 in order to avoid buffer overrun conditions.

Derivation of the resampling factor $\kappa_{rs}$ and the number of samples to be destroyed Given the determined target fill quantity $\tilde{\mathcal{F}}_{target}(K_{obs})$ of the audio sample buffer 52 and a measure of the average instantaneous fill quantity $\tilde{\mathcal{F}}(K_{obs})$ as determined during each observation event, the resampling factor $\kappa_{rs}$ and, in some embodiments, the number of samples to be destroyed from FIG. 6 are updated to steer the audio sample buffer 52 into the right direction.

The resampling factor $\kappa_{rs}$ is defined as the relation of the number of output audio samples to the number of input audio samples of the adaptive resampler 51. The number of audio samples to be fed into (and, thus, received by) the adaptive resampler 51 is $N_{in}$ and the number of output audio samples is $N_{in}'$. The resampling factor $\kappa_{rs}$ is hence $$\kappa_{rs} = \frac{N_{in}'}{N_{in}}$$

with $\kappa_{rs}>1$ if the fill quantity of the audio sample buffer 52 is supposed to be increased and $\kappa_{rs}<1$ if the fill quantity is supposed to be decreased.

Figure 11:
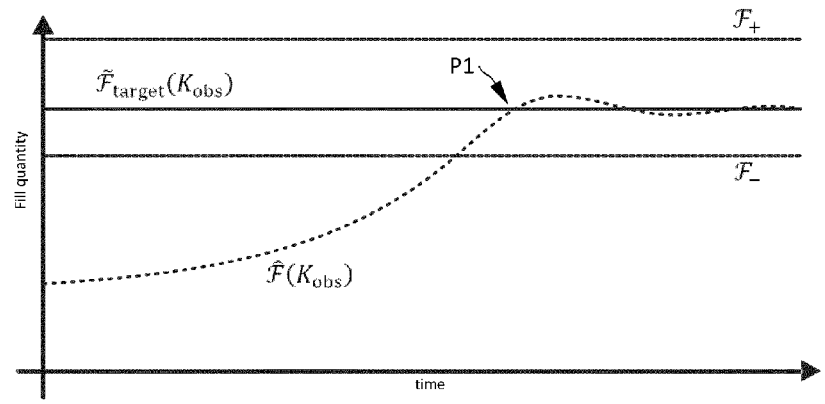
FIG. 11 shows an example illustrating the temporal evolution of the control of the fill quantity of an audio sample buffer.

In order to explain the determination of the resampling factor $\kappa_{rs}$, let us first review the example for a typical temporal evolution of the estimated average instantaneous fill quantity of the audio sample buffer 52 given a determined target fill quantity of the audio sample buffer 52, which is depicted in FIG. 11.

In that figure, the temporal evolution of the determined target fill quantity $\tilde{\mathcal{F}}_{target}(K_{obs})$ of the audio sample buffer 52—which is constant—and that of the estimated average instantaneous fill quantity $\tilde{\mathcal{F}}(K_{obs})$ of the audio sample buffer 52 are shown as the solid and the dotted curve, respectively.

At the beginning, the curves deviate significantly. In order to steer the estimated average instantaneous fill quantity of the audio sample buffer 52 into the direction of the determined target fill quantity, the resampling factor $\kappa_{rs}$ is adjusted such that the fill quantity of the audio sample buffer 52 slowly increases to finally reach the optimal value.

Note that the shown steering process is a control engineering problem. However, as the determination of the average instantaneous fill quantity of the audio sample buffer 52 is a rather slow process, a high controller delay can be expected. This can lead to instabilities in the control loop which, should be avoided. Hence, special care should be taken in order to carefully adjust the parameters as described in the following.

For a realization of the adaptive resampler controller 57, the resampling factor $\kappa_{rs}$ is expressed in terms of a value $\Delta_N = N_{in}' - N_{in}$, which can be derived from the resampling factor $\kappa_{rs}$ as $$\Delta_N = (\kappa_{rs} - 1) \cdot N_{in}$$

and which describes the value by which the number of output samples deviates from the number of input (received) samples of the adaptive resampler 51.

In order to cover different aspects, $\Delta_N$ is composed of three subcomponents, $$\Delta_N = \Delta_{N,var} + \Delta_{N,const} + \Delta_{N,slow}$$

In this example, the aspects to be covered are the following:
1. Given there is a sample rate drift between the two connected partners, the adaptive audio sample buffer 50 should compensate for it. For this purpose, $\Delta_N$, here, contains a constant offset $\Delta_{N,const}$, which compensates for the sample rate drift. $\Delta_{N,const}$ could be setup at the beginning of a VOIP connection and afterwards remain constant since in general, the sample rates may not drift over time.
2. If the estimated average instantaneous fill quantity of the audio sample buffer 52 deviates very much from the determined target fill quantity, in most cases, there may have been a modification of the network status. It is thus very likely that the network status has just switched from good to bad. In this case, the fill quantity of the audio sample buffer 52 should be changed quickly. The component $\Delta_{N,var}$ may vary significantly from time to time and can help to change the fill quantity quickly.
3. If the measured fill quantity of the audio sample buffer 52 is already very similar to the determined target fill quantity, the fill quantity of the audio sample buffer 52 should be steered carefully in order to avoid overshooting (due to the mentioned delay of the fill quantity estimation) and fill quantity oscillations. Therefore, the component $\Delta_{N,slow}$ is chosen here in the range of $-1 \leq \Delta_{N,slow} \leq +1$.

The determined sample modification values may be fractional values (double precision) and are not restricted to be integer values. This, however, depends on the adaptive resampler 51 supporting fractional output (refer to the next section). Allowing fractional numbers of output samples may increase the performance of the described control loop.

In order to derive the sample modification components, in FIG. 11, a corridor surrounding the determined target fill quantity $\hat{\mathcal{F}}_{target}(K_{obs})$ is given by an upper corridor limit $\mathcal{F}_+$ and a lower corridor limit $\mathcal{F}_-$. Here, the distance from the lower corridor limit $\mathcal{F}_-$ to the determined target fill quantity is smaller than that of the upper corridor limit $\mathcal{F}_+$ to the determined target fill quantity. This is by intention and due to the fact that it is more problematic if the determined target fill quantity of the audio sample buffer 52 is too low than if it were too high, because in the former case, buffer underruns may occur.

The corridor limits $\mathcal{F}_-$ and $\mathcal{F}_+$ are computed based on the previously determined jitter as $$\mathcal{F}_+ = \mathcal{F}_{target} + \beta_+ \cdot \frac{\Delta \mathcal{F}_{no\_jitter}}{2} + \frac{\Delta \mathcal{F}_{jitter}}{2}$$

and $$\mathcal{F}_- = \mathcal{F}_{target} - \beta_- \cdot \frac{\Delta \mathcal{F}_{no\_jitter}}{2} + \frac{\Delta \mathcal{F}_{jitter}}{2}$$

with $\beta_- < \beta_+$ to achieve the described desired asymmetry of the corridor.

In addition to that, from one observation event to the next, also the gradient of the estimated average instantaneous fill quantity of the audio sample buffer 52 may be determined in order to detect the direction of the fill quantity curve towards the determined target fill quantity or into the other direction.

Depending on whether the estimated average instantaneous fill quantity of the audio sample buffer 52 is inside or outside the given corridor, different strategies are followed:

If the estimated average instantaneous fill quantity of the audio sample buffer 52 is outside the corridor, a value for $\Delta_{N,var}$ is directly computed from the distance of the estimated average instantaneous fill quantity and the upper or lower corridor limits, $$\Delta_{N,var} = \begin{cases} -\varepsilon_+ \cdot (\hat{\mathcal{F}}(K_{obs}) - \mathcal{F}_+) & \text{if } \hat{\mathcal{F}}(K_{obs}) > \mathcal{F}_+ \\ +\varepsilon_- \cdot (\mathcal{F}_- - \hat{\mathcal{F}}(K_{obs})) & \text{if } \hat{\mathcal{F}}(K_{obs}) < \mathcal{F}_- \end{cases}$$

with $\varepsilon_+$ and $\varepsilon_-$ as constants that are subject to tuning procedures.

The value of $\Delta_{N,var}$ should be limited to avoid audible artifacts such as pitch modifications caused by the adaptive resampler 51. Therefore, part of $\Delta_{N,var}$ may be transformed, in some embodiments, into the number of samples to be destroyed from FIG. 6, which may be removed from the audio sample buffer 52 in a way different to the adaptive resampler 51.

The component $\Delta_{N,const}$ is modified in case that the estimated average instantaneous fill quantity of the audio sample buffer 52 tends to point away from determined target fill quantity. If this is the case, the value of $\Delta_{N,const}$ is increased by 1.

$\Delta_{N,slow}$ does not play any role in this case, because the other values are significantly higher. It is therefore chosen as $\Delta_{N,slow} = 0$.

If the estimated average instantaneous fill quantity of the audio sample buffer 52 is inside the corridor, a non-zero value of $\Delta_{N,var}$ is slowly decreased towards zero as follows:

$$\Delta_{N,var}(K_{obs,i}) = \frac{\Delta_{N,var}(K_{obs,i-1})}{2}.$$

In this context, $\Delta_{N,var}$ is written as a function of the index of the observation event $K_{obs,i}$ to show the temporal aspect.

The value of $\Delta_{N,const}$ may be modified as before by increasing or decreasing by 1. This, however, happens if the curve of the estimated average instantaneous fill quantity of the audio sample buffer 52 has previously crossed the line of the determined target fill quantity (highlighted by marker P1 in FIG. 11). As a result, the value of $\Delta_{N,const}$ does not change too much while the estimated average instantaneous fill quantity of the audio sample buffer 52 is inside the corridor in order to avoid fill quantity oscillations.

The value $\Delta_{N,slow}$ is set in order to slowly move the estimated average instantaneous fill quantity of the audio sample buffer 52 closer to the determined target fill quantity. It is chosen as $$\Delta_{N,slow} = \begin{cases} -\xi_+ \cdot \dfrac{\hat{\mathcal{F}}(K_{obs}) - \hat{\mathcal{F}}_{target}(K_{obs})}{\mathcal{F}_+ + \hat{\mathcal{F}}_{target}(K_{obs})} & \text{if } \hat{\mathcal{F}}(K_{obs}) > \hat{\mathcal{F}}_{target}(K_{obs}) \\ +\xi_- \cdot \dfrac{\hat{\mathcal{F}}_{target}(K_{obs}) - \hat{\mathcal{F}}(K_{obs})}{\hat{\mathcal{F}}_{target}(K_{obs}) - \mathcal{F}_-} & \text{if } \hat{\mathcal{F}}(K_{obs}) < \hat{\mathcal{F}}_{target}(K_{obs}) \end{cases}$$

with $\xi_+$ and $\xi_-$ as constants that are subject to tuning procedures.

The overall number of audio samples $\Delta_N$ to be modified by the adaptive resampler 51 should be limited such that its absolute value does not exceed a specific value. This limitation may reduce the speed at which the estimated average instantaneous fill quantity of the audio sample buffer 52 follows the determined target fill quantity, but it may increase the overall audio quality as it reduces the degree of pitch modification introduced by the adaptive resampler 51. In one embodiment, this limitation is to limit the value of $\Delta_N$ to not exceed 4% of the frame size $\Delta_{in}$.

Realization of the Adaptive Resampler 51

Different approaches may be utilized to realize the adaptive resampler 51. The overall goal of these approaches is to increase or decrease the number of output audio samples in relation to the number of audio samples that have arrived as packets via the network link. This is explained based on two examples:

Assuming that 100 samples arrive within each VOIP packet, a reduction of the fill quantity of the audio sample buffer 51 can be achieved if instead of the 100 audio samples only 99 audio samples are fed into the audio sample buffer 52. The purpose of the adaptive resampler 51 is to reduce the amount of audio samples without that any audio artifacts become audible.

On the other hand, assuming that 100 audio samples arrive within each VOIP packet, an increase of the fill quantity of the audio sample buffer 52 can be achieved if instead of the 100 audio samples 101 audio samples are fed into the audio sample buffer 52. The purpose of the adaptive resampler 51 is to increase the amount of audio samples without that any audio artifacts become audible.

Different approaches for this kind of task have been proposed in the context of time stretching for voice and audio such as the Waveform Similarity Overlap-Add (WSOLA) approach (see W. Verhelst and M. Roelands. An overlap-add technique based on waveform similarity (WSOLA) for high quality time-scale modification of speech. In Acoustics, Speech, and Signal Processing, 1993. ICASSP-93, 1993 IEEE International Conference on pages 554-557, vol. 2, 1993), different approaches to realize a Phase Vocoder (see M. Dolson. The phase vocoder: A tutorial. Computer Music Journal, 10(4):14-27, 1986) and approaches to exploit segments with audio pauses to reduce the number of audio samples.

Besides the capability to accurately steer the capability to reduce the number of audio samples, it is important that the time stretching is not audible, neither for operation without any time stretching impact (that is: the number of input (received) audio samples of the adaptive resampler 51 is identical to the number of output samples) nor given that a massive reduction of number of audio samples is achieved. In this context, most approaches realizing a time stretching based on a phase vocoder are not suitable.

Also, a high granularity of control of the exact number of audio samples to be output by the adaptive resampler 51 should be achieved to stabilize the control of the fill quantity of the audio sample buffer 52, as described in the previous sections. The adaptive resampler controller 57 may continuously adapt the resampling factor $\kappa_{rs}$ if the number of output samples is given with integer resolution, which can lead to delay oscillations. The adaptive resampler 51 should therefore, in some embodiments, be able to output a fractional number of audio samples.

And finally, targeting binaural signals, it is important that given a stereo adaptive jitter buffer, waveform manipulation approaches to preserve the binaural cues—in particular the interchannel time difference (ITD).

In various embodiments, a modified resampling filter composed of lowpass filters and decimation functionality is employed to fulfill the defined constraints. Under certain conditions, it continuously outputs a specific number of audio samples which deviates from the number of input audio samples. Also, fractional numbers of output audio samples are possible (It is noted that despite some embodiments where integer numbers of audio samples can be output, a fractional output rate can be achieved by varying the number of output audio samples over time, e.g., given an output rate of 100.5, the adaptive resampler 51 may output 100 samples if called for the first time and 101 samples if called for the second time).

The proposed resampling filter causes almost no audible artifacts for speech signals in a wide range of resampling factors $\kappa_{rs}$, and the binaural cues can be preserved since left and right channel signal are processed identically. One possible drawback of this approach is that for music, slight variations of the pitch of the modified signal may be perceivable.

A concrete realization of the adaptive resampler 51 follows the method proposed in M. Pawig, Gerald Enzner, Peter Vary, "Adaptive sampling rate correction for acoustic echo control in Voice-Over-IP", IEEE Transactions on Signal Processing, Vol. 58, No. 1, pp. 189-199, January 2010, in which an upsampling functionality combined with a Lagrange interpolator provides the required degree of freedom considering the output rate as well as an efficient implementation and high (non-audible) quality. The original implementation is slightly extended in order to allow also fractional sample output.

Modification of the Fill Quantity of the Audio Sample Buffer 52 by Other Means

In addition to the resampling factor $\kappa_{rs}$, which controls the adaptive resampler 51, the adaptive resampler controller 57 may provide the number of samples to be destroyed (refer to FIG. 6) to reduce or increase the number of audio samples in the audio sample buffer 52 quickly. In most cases, the adaptive resampler controller 57 may have computed a large value of $\Delta_N$, which is then limited to avoid audible pitch modifications. The remainder is then the number of samples to be destroyed.

In order to really destroy the proposed number of audio samples, instead of the adaptive resampler 51, other methods may be followed. One such method would be to search for pauses in the audio sample buffer 52 and to remove or to extend these pauses. Care has to be taken, however, that these pauses are removed identically in both channels in case of binaural signals in order to preserve the binaural cues.

Example for the Temporal Evolution of the Fill Quantity of the Audio Sample Buffer 52

Figure 12:
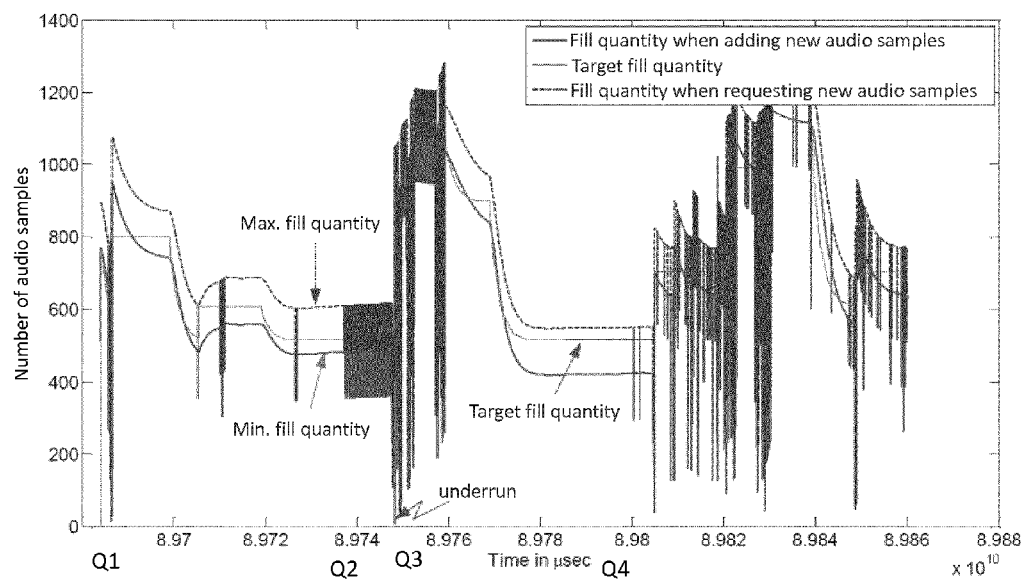
FIG. 12 shows experimental results illustrating the temporal evolution of the control of the fill quantity of an audio sample buffer.

FIG. 12 shows one example of the temporal evolution of the fill quantity of the audio sample buffer 52, which may be considered in the context of a VOIP based communication given a TCP connection via a WIFI transmission link.

In the figure, the instantaneous fill quantity of the audio sample buffer 52 is shown on the y-axis whereas the time is shown on the x-axis. The solid, light gray curve represents the instantaneous fill quantity of the audio sample buffer 52 just before new samples are written thereto; it is therefore also denoted as the "Min. fill quantity". Analog to the "Min. fill quantity", the stippled, dark gray curve represents the instantaneous fill quantity of the audio sample buffer 52 just before samples are read therefrom; it is therefore also denoted as "Max. fill quantity". The dotted curve represents the determined target fill quantity.

During operation, after the start-up (marker Q1), the audio sample buffer 52 is controlled to a stable state in which the safety distance to a buffer underflow condition is kept and the delay is reasonably low (marker Q2). After approximately one third of the operation, a buffer underrun condition occurs (marker Q3). As a consequence, the jitter estimator 55 detects a large jitter, and the adaptive resampler controller 57 steers the audio sample buffer 52 into a secure state, in which a large distance to a possible further buffer underrun condition is achieved. Then, after a while during which no large jitter has been observed, the fill quantity of the audio sample buffer 52 is steered back to lower values (marker Q4) in order to minimize the end-to-end delay.

Other variations to the disclosed embodiments can be understood and effected by those skilled in the art in practicing the claimed embodiments, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An adaptive jitter buffer for buffering audio data received via a packet-switched network, comprising:
adaptive-resampler circuitry that receives a number of audio samples of the audio data and that outputs a first number of audio samples, which are resampled from the received number of audio samples according to a resampling factor,
an audio sample buffer that buffers audio samples, wherein the outputted first number of audio samples are written to the audio sample buffer during an input access event and a second number of audio samples are read from the audio sample buffer during an output access event, and
audio-sample-buffer-fill-quantity-controller circuitry that controls a fill quantity of the audio sample buffer, wherein the audio-sample-buffer-fill-quantity-controller circuitry controls the fill quantity of the audio sample buffer based on controlling the resampling factor of the adaptive-resampler circuitry.

2. The adaptive jitter buffer according to claim 1, wherein the audio-sample-buffer-fill-quantity-controller circuitry comprises:
audio sample buffer fill quantity estimator circuitry that estimates an average instantaneous fill quantity of the audio sample buffer during an observation event,
jitter estimator circuitry that estimates a jitter,
audio sample buffer target fill quantity determiner circuitry that determines a target fill quantity of the audio sample buffer in dependence of the estimated jitter, and
adaptive-resampler-controller circuitry that controls the resampling factor of the adaptive-resampler circuitry such that the fill quantity of the audio sample buffer approaches the determined target fill quantity of the audio sample buffer.

3. The adaptive jitter buffer according to claim 2, wherein the audio sample buffer fill quantity estimator circuitry estimates the average instantaneous fill quantity of the audio sample buffer during the observation event based on calculating a weighted average of the fill quantities of the audio sample buffer between pairs of temporally adjacent access events that occurred between the observation event and a temporally adjacent previous observation event.

4. The adaptive jitter buffer according to claim 3, wherein the calculation of the weighted average includes weights that depend on the normalized temporal distances between the pairs of temporally adjacent access events.

5. The adaptive jitter buffer according to claim 3, wherein a number of input access events between the observation event and the temporally adjacent previous observation event is in the range between 2 and 20.

6. The adaptive jitter buffer according to claim 2, wherein the audio sample buffer target fill quantity determiner circuitry determines the target fill quantity of the audio sample buffer based on determining a fill quantity variance corridor of the audio sample buffer, wherein the target fill quantity of the audio sample buffer is determined to be located within the fill quantity variance corridor of the audio sample buffer.

7. The adaptive jitter buffer according to claim 6, wherein the audio sample buffer target fill quantity determiner circuitry determines the fill quantity variance corridor of the audio sample buffer based on determining a first portion of the fill quantity variance corridor of the audio sample buffer independent of a jitter and a second portion of the fill quantity variance corridor of the audio sample buffer in dependence of the estimated jitter.

8. The adaptive jitter buffer according to claim 2, wherein the audio sample buffer target fill quantity determiner circuitry determines the target fill quantity of the audio sample buffer based on determining a safety distance between the fill quantity variance corridor of the audio sample buffer and a buffer underrun condition of the audio sample buffer.

9. The adaptive jitter buffer according to claim 2, wherein the audio sample buffer target fill quantity determiner circuitry performs a temporal smoothing of the determined target fill quantity of the audio sample buffer.

10. The adaptive jitter buffer according to claim 2, wherein the adaptive-resampler controller circuitry controls the resampling factor of the adaptive-resampler circuitry based on determining a corridor surrounding the determined target fill quantity of the audio sample buffer, wherein the control is performed differently depending on whether the estimated average instantaneous fill quantity of the audio sample buffer is inside or outside the corridor.

11. The adaptive jitter buffer according to claim 2, wherein the adaptive-resampler controller circuitry controls the resampling factor of the adaptive-resampler circuitry such that the outputted first number of audio samples is effectively a fractional number.

12. The adaptive jitter buffer according to claim 2, wherein the audio data comprises a first audio channel and a second audio channel, wherein the adaptive-resampler circuitry resamples audio samples from the first audio channel and audio samples from the second audio channel, and wherein the adaptive-resampler controller circuitry controls the resampling factor of the adaptive-resampler circuitry to be the same for the audio samples from the first audio channel and the audio samples from the second audio channel.

13. The adaptive jitter buffer according to claim 1, further comprising:
a packet buffer that reorders packets, which comprise an encoded version of the audio data, when the packets are received in an incorrect temporal order via the packet-switched network.

14. The adaptive jitter buffer according to claim 13, further comprising:
an audio data decoder that decodes the encoded version of the audio data, wherein the audio data decoder comprises a first audio data loss concealer that artificially generates audio data when a packet was lost or could not be reordered.

15. The adaptive jitter buffer according to claim 14, further comprising a second audio data loss concealer that artificially generates audio data samples when a buffer underrun condition of the audio sample buffer occurs.

16. A device for receiving audio data, comprising:
an input that receives the audio data;
an adaptive jitter buffer that includes an adaptive audio sample buffer, wherein the adaptive audio sample buffer comprises:
first circuitry that receives a number of audio samples of the audio data and that outputs a first number of audio samples, which are resampled from the received number of audio samples according to a resampling factor,
an audio sample buffer that buffers audio samples, wherein the outputted first number of audio samples are written to the audio sample buffer during an input access event and a second number of audio samples are read from the audio sample buffer during an output access event, and
second circuitry that controls the fill quantity of the audio sample buffer, wherein the second circuitry controls the fill quantity of the audio sample buffer based on controlling the resampling factor of the first circuitry; and
an output that performs audio playback of the audio data by requesting the second number of audio samples via the output access event.

17. A method to buffer audio data received via a network, comprising:
receiving audio samples of the audio data;
sampling a first number of audio samples from the received audio samples based on a resampling factor;
storing the first number of audio samples in an audio sample buffer during an input access event, the audio sample buffer having a fill quantity defined as a current number of audio samples stored in the audio sample buffer;
outputting a second number of audio samples from the audio sample buffer during an output access event; and
modifying the fill quantity of the audio sample buffer by modifying the resampling factor such that the fill quantity approaches a target fill quantity that is based on an estimated delay of adjacent input access events and adjacent output access events.

\* \* \* \* \*